United States Patent Office 3,376,344
Patented Apr. 2, 1968

3,376,344
N,N'-BIS-(2-AMINOETHYL)-1,3-BIS (2-AMINO-ALKYL) BENZENES
Robert E. Lane and William P. Frazier, Lake Jackson, Tex., and Otis C. Dermer, Stillwater, Okla., assignors to The Dow Chemical Company, Midland, Mich., a corporation of Delaware
No Drawing. Filed Apr. 3, 1964, Ser. No. 357,310
2 Claims. (Cl. 260—570.5)

This invention concerns the preparation of aralkyl polyamines and their utility as epoxy resin curing agents to give cured epoxy resins having superior Izod impact strengths.

Certain amines containing aromatic rings are known to be useful in reacting with epoxy resins to give cured plastics having superior physical properties, inter alia, higher heat distortion. In general, such cured resins have Izod impact strengths up to ca. 0.46 ft. lb./in. for 7000 p.s.i. tensile products.

It was desired to be able to prepare a like utility group of amines from comparatively inexpensive reactants such as vinylaromatic hydrocarbons, on the one hand, and polyalkylenepolyamines, on the other hand, but giving cured epoxy resins having superior Izod impact strengths.

It has now been discovered that certain polyalkylenepolyamines will react with vinylaromatic hydrocarbons to give 2-arylethyl-substituted polyamines in good yields, some as high as 90 percent. These products find valuable utility as curing agents or hardeners for epoxy resins, particularly giving superior Izod impact strengths as compared with other curing agents.

It is known to react aldehydes or halogen-containing compounds with amines to produce polyamines which are similar in utility, but this requires both expensive reagents and expensive purification procedures. The prior art also teaches that yields of the order of 20 to 40 percent are obtainable from the reaction of certain olefins with alkylamines in the presence of metallic sodium. However, compounds containing only one amino group are unsatisfactory as curing agents for epoxy resins, i.e., preferred systems are those wherein the hardener molecule contains at least two reactive nitrogens. Wooster et al., J. Am. Chem. Soc., 56, 1133 (1934), teach that styrene will not react with ammonia, while others teach that high temperatures are required; Wegler et al., Chem. Ber., 83, 1–6 (1950), 150 degrees C.; Howk et al., J. Am. Chem. Soc., 76, 1899 (1954), 175 to 250 degrees C.+800–1000 atm. pressure In the practice of one process of this invention, a vinylaryl compound having the formula

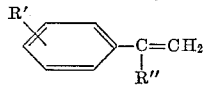

wherein R' is H, $C_1$–$C_{20}$ alkyl, —CH=$CH_2$, —$NH_2$, —NH(1–10C alkyl) or —C(R")=$CH_2$ and R" is H or $C_1$–$C_{10}$ alkyl is reacted with at least a 100 percent excess of an amine of the type $NH_2$(—R'''—NH—)$_x$H where R''' is $C_1$–$C_{10}$ alkylene or —$CH_2CH_2$(—$OCH_2CH_2$—)$_y$ wherein y is 1 to 15 and x is 1 to 20, i.e., at least two equivalents of amine per equivalent of vinyl group, in the presence of a strongly basic catalyst at a temperature in the range of about −30 to 100 degrees C. for a time sufficient for substantially complete reaction. Completion of reaction is indicated when no free vinylaryl compound can be detected. The condensation reaction is carried out in an inert nonpolar solvent. The reaction can be outlined as follows:

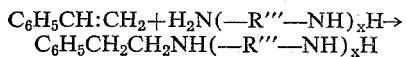

where the first reactant is styrene and the second is an amine as described above. Thus, for each vinyl group or substituted vinyl group, an alkylenediamine or polyalkylenepolyamine is added. Advantageously, an excess of up to 5 equivalent proportions of amine per equivalent of vinyl group is used. Excess amine is recoverable for reuse, so that the amount of excess is not important, provided that at least 100% molar excess is used.

The compounds obtained by the process of this invention are generally water-clear to light-yellow liquids of about 1 g./ml. density. Those prepared from ethylenediamine are generally of low solubility in water except the di-adduct with divinylbenzene, while the compounds prepared from higher molecular weight polyalkylenepolyamines are quite water soluble. The larger the alkylene or oxyethylene group noted as R''' above, the less water soluble the product will be.

Amines operable in the process of this invention are the alkylenediamines and polyalkylenepolyamines, such as ethylenediamine, diethylenetriamine, triethylenetetramine, tetraethylenepentamine; the corresponding polyalkylenepolyamine compounds containing up to 10-carbon alkylene groups; the corresponding polyalkylenepolyamines having up to 20 carbon alkylene groups; and the analogous polyoxyethylenepolyamines.

The vinylaryl compounds operable in the process of this invention are those identified above as

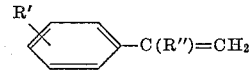

including styrene and alkylstyrenes, e.g., vinyltoluenes, vinylxylenes, vinylnapthalenes, α-methylstyrene, divinylbenzene, and, broadly, those vinylaryl compounds having as a nuclear substituent a $C_1$–$C_{20}$ alkyl, —CH=$CH_2$, —C(R")=$CH_2$, —$NH_2$ or —NH alkyl group as defined earlier.

The strongly basic catalysts useful in the above condensation reaction are the alkali metals, e.g., lithium, sodium, potassium, their amides such as sodium amide, their hydrides, their alcoholates, e.g., $NaOCH_3$, their alkyls, e.g., butyllithium, and their adducts with arenes, e.g., sodium biphenyl and sodium naphthalene. They are used in proportions of 1 to 20 percent and preferably 2 to 5 percent of the moles of vinylaryl compound.

The process of this invention is necessarily carried out in a solvent proportion of an inert solvent in order to obtain the high yields of the desired products herein. Inert solvents having a static dielectric constant less than about 10 are operable, while those with less than 4 are preferred. These include liquid saturated aliphatic or aromatic hydrocarbons (of which benzene and toluene are preferred), tetrahydrofuran and ethylene glycol dimethyl ether. Alternately, the solvent may be an excess of the amine being employed as a reactant. A proportion of the solvent at least sufficient to dissolve the catalyst and reactants, and preferably 5 to 10 times the volume of vinylaryl compound is used.

While a reaction temperature range of −30 degrees to 100 degrees C. is operable, one of 10 to 30 degrees C. is preferred. At operable reaction temperatures, a short reaction time up to about 3 hours suffices. Progress of the reaction can be followed by testing for the olefinic unsaturation of the vinylaryl compound, so that substantial completion of the reaction can be determined readily.

The liquid epoxy resins which are curable with the curing agents disclosed above to give high Izod impact strength products are those which have glycidyl ether groups, the most widely used of which resins is the diglycidyl ether of bisphenol A, $C(CH_3)_2(C_6H_4OH)_2$. The commercial bisphenol A-diglycidyl ether liquid resins have viscosities in the 8,000 to 20,000 centipoise range.

These commercial products contain some higher weight homologs, branched-chain molecules, isomers and occasionally monoglycidyl ethers in combination with the basic structure.

Other liquid epoxy resins operable in the process of this invention are monoglycidyl ether molecules containing for a second reactive point a monoolefinic ether group, e.g., allyl glycidyl mixed ether of bisphenol A, glycidyl ethers of mononuclear polyhydric phenols, e.g., of resorcinol, hydroquinone, saligenin, and phloroglucinol; glycidyl ethers of polynuclear polyhydric phenols, e.g., of bisphenol F, $[CH_2(C_6H_4OH)_2]$; bisphenol A (dihydroxy diphenyl dimethyl methane); bis(hydroxyphenyl) sulfone; Novolac resins; and glycidyl ethers of polyhydric alcohols, e.g., of ethylene glycol, 2,3-butanediol, pentaerythritol and glycerine.

Commercially speaking, only four resin types other than diglycidyl ether of bisphenol A (and its homologs) are of significance; Lee and Neville: Epoxy Resins, 1957. They are glycidyl ethers of glycerol; glycidyl ethers of bisphenol F; glycidyl ethers of a long chain bisphenol, such as described in U.S. Patent 2,665,266; and epoxylated Novolac resins, such as described in British Patent 746,824. Skeist: Epoxy Resins, 1958, classifies the commercial epoxy resins into the following groups: (1) aliphatic liquid epoxies; (2) modified liquid epoxies comprising aromatic diepoxides plus reactive diluents such as butyl glycidyl ether or phenyl glycidyl ether which lower the viscosity; (3) liquid aromatic epoxies in which diglycidyl ether of bisphenol A predominates; and (4) solid aromatic epoxies, liquefiable on heating, which contain an average of ca. 1½ epoxy groups per molecule, plus from 2 to 15 hydroxyl groups.

The arylethyl-substituted polyamines described above are effective in curing (hardening) glycidyl-ether containing epoxy resins by reaction with the protons of the polyamine amino groups. Each of the protons attached to a nitrogen atom is capable of reacting with or opening an epoxide ring, thereby forming a secondary amine, which in turn reacts with another epoxy group. Secondary amino groups of those arylethyl-substituted polyamines of the present invention which have secondary amino groups similarly react through their protons with epoxy groups. The reaction of amines with epoxy resins is known to give secondary alcohol-type polymers. The secondary alcohol hydroxyl groups stimulate remaining reactive amino groups to react more rapidly with other epoxy groups. Thus, the reaction therebetween is autocatalytic, building up at a continually faster rate until substantially all of the amino hydrogen or epoxide has been utilized.

For making the cured products of this invention, an amount of arylethyl-substituted polyamine is utilized which provides the theoretical or substantially theoretical proportion of amino hydrogen required to react with the reactive epoxy groups, i.e., one active hydrogen atom, amino hydrogen, for each epoxy group. Such proportions will be referred to hereinafter as "stoichiometric" or "substantially stoichiometric." For determining the stoichiometric proportions of epoxy resins and polyamines required, one deals generally in terms of epoxide equivalent, i.e., the weight of resin in grams which contains one gram equivalent of epoxy group. One gram equivalent of epoxy is equal to one gram equivalent of amino hydrogen.

The hardening or curing of the epoxy resins is carried out by reacting therewith a substantially stoichiometric proportion of one or more of the polyamines identified above, while maintaining the reaction temperature within a range of about 50 to 150 degrees C. for a time sufficient to cure the resin, as determined by successive impact strength tests on samples of the reacted mixture thereof. This generally requires from ½ to 24 hours, preferably 3–5 hours or more, to develop substantially maximum impact strength. The curing reaction is moderately exothermic; the longer the polyamine chain, the more exothermic the curing reaction.

The present application is directed to, and is concerned with, the disclosure and claiming of the invention as described hereinbefore. The present application is also directed to the disclosure and claiming of the invention in compounds, methods or compositions comprising or employing any subgeneric group or class of compounds which may be obtained by any permutation or combination of the alternative expressions in the several definitions to be found hereinbefore.

The following examples describe completely representative specific embodiments and the best mode contemplated by the inventors of carrying out their invention. They are not to be considered as limiting the invention other than as defined in the claims.

Example 1

Into a reaction vessel equipped with a means for stirring, refluxing, purging, temperature control and reactant addition are placed 747 g. of dried ethylenediamine, 5.8 g. of sodium ribbon and 850 g. of dried benzene. To this mixture is added 259 g. of dried styrene, intermittently over a 60–180 min. time period, while maintaining the temperature at 33 degrees C. Upon completion of the styrene addition, the reaction mixture is digested for 30 min. at 23 degrees C. That the reaction is proceeding is indicated by the formation of a dark red color.

The fact that no styrene is left in the reaction mixture (as shown by analysis of the product) indicates that the reaction went to completion. The reaction mixture is filtered, flash-distilled, and 1309 g. of the benzene-ethylenediamine solution is recovered. The reaction mixture is then distilled at 110 degrees C. under a pressure of 0.07 mm. of Hg and there is obtained 271.3 g. of N-(β-phenethyl)ethylenediamine. The yield is 62.4 percent. The infrared spectrum is consistent with that expected for the desired product. Properties:

$n_D^{20} = 1.5341$
boiling point = 120 degrees C. at 0.13 mm. Hg.

The product thus produced is useful as a reactive hardener for epoxy resins. A bisphenol A-epichlorohydrin-type epoxy resin in the amount of 188 g. (1.0 epoxy equivalents) is reacted with 57.7 g. of N-(β-phenethyl) ethylenediamine (1.0 amino hydrogen equivalents) at 80 degrees C. for 18 hours. The resulting cured plastic has the following properties:

tensile strength = 12,175 p.s.i.
elongation = 11.3%
impact, Izod, notched = 2.4 ft. lb./in. notch
Shore D hardness = 84
heat distortion temp. = 65 degrees C.

Example 2

The procedure of Example 1 is repeated with the following reaction mixture:

1110 g. of diethylenetriamine
1000 ml. of toluene
25 g. of sodium metal
231.3 g. of styrene A quantity of 370.7 g. (76.7 percent yield) of N-(β-phenethyl)diethylenetriamine at a reaction temperature of 25 degrees C. is obtained having the following properties:

boiling point = 146 degrees C. at 0.16 mm. Hg.
$n_D^{20} = 1.5337$
$d_4^{22} = 1.018$ g./ml.

A bisphenol A-epichlorohydrin epoxy resin, 1.0 epoxy equivalents, when reacted in the amount of 188 g. with 52 g. of the above product, 1.0 amino hydrogen equivalents, in the manner previously described gives a cured plastic having the following properties:

tensile strength=11,243 p.s.i.
elongation=10.3%
impact, Izod, notched=1.0 ft. lb./in. notch
Shore D hardness=85
heat distortion temp.=96.7 degrees C.

Example 3

The procedure of Example 1 is repeated with the following reaction mixture:

| | G. |
|---|---|
| Triethylenetetramine | 1762 |
| Sodium | 4.6 |
| Styrene | 253.5 |
| Toluene | 1591 |

There is obtained 377.2 g. (62 percent yield) of N-($\beta$-phenethyl)triethylenetetramine having the following properties:

boiling point=165 degrees C. at 0.08 mm. Hg.
$n_D^{20}$=1.5340
$d_4^{22}$=1.026 g./ml.
soluble in: xylene, benzene and water A bisphenol A-epichlorohydrin epoxy resin, when cured in the manner previously described with proportions of 60 g. of the above product, 1.0 amino hydrogen equivalents gives a product having the following properties:

tensile strength=3,850 p.s.i.
elongation=19%
impact, Izod, notched=0.64 ft. lb./in. notch
Shore D hardness=85.5
heat distortion temp.=85 degrees C.

Example 4

Derivatives are prepared according to the procedure of Example 1 using molecular proportions of reactants as given below:
 (a) Tetraethylenepentamine (3.16 moles), styrene (0.645 mole), Na (0.15 mole), toluene (600 ml.) to give 87 g. of N-($\beta$-phenethyl)tetraethylenepentamine;
 (b) N,N'-diisobutyltriethylenetetramine (3.61 moles), styrene (0.905 mole), Na (0.1 mole), toluene (1200 ml.) to give 300 g. of N-($\beta$-phenethyl)-N',N''-diisobutyl-triethylenetetramine;
 (c) Ethylenediamine (71.1 moles), divinylbenzene (0.455 mole), Na (0.69 mole), toluene (4800 ml.) to give 477 g. of N,N'-bis(2-aminoethyl)-bis(2-aminoethyl) benzene;
 (d) Ethylenediamine (71.1 moles), ethylvinylbenzene (4.11 moles), Na (0.69 mole), toluene (4800 ml.) to give 548 g. of 1-(3-ethylphenethyl)ethylenediamine.

The physical properties of the products so obtained and of bisphenol A-epichlorohydrin epoxy resins cured therewith are listed in the following table:

Example 5

The procedure of Example 1 is repeated, substituting $\alpha$-methylstyrene in place of styrene to give a product in 59.6 percent yield having the properties $n_D^{20}$=1.5274, B.P.=115°/0.35 mm. and identified by vapor phase chromatography and its infrared spectrum as N-(2-phenylpropyl)ethylenediamine.

Example 6

A quantity of 245.6 g. triethylenetetramine and 631.1 g. toluene is mixed and cooled to 5 degrees C., then 5.3 g. (50 percent active) sodium dispersion is added. Styrene (59.7 g.) is then added dropwise over an 80 min. period at a reaction temperature of 50 degrees C. An 85 percent yield (942 g. of crude product containing solvent, of which 122 g. is pure N-($\beta$-phenethyl)triethylenetetramine) is obtained as determined by vapor phase chromatography.

Example 7

N-($\beta$-phenethyl)ethylenediamine is used as a reactive hardener with several epoxy resins, in proportions as specified below:

(1)

| | G. |
|---|---|
| Hardener | 59 |
| Epoxy resin prepared from a 400 mol. wt. polypropylene glycol and epichlorohydrin | 320 |

(2)

| | |
|---|---|
| Hardener | 59 |
| Product of a phenol-formaldehyde Novolac syrup and epichlorohydrin | 180 |

(3)

| | |
|---|---|
| Hardener | 59 |
| Shell Chemical's bisphenol A-epichlorohydrin resin | 190 |

(4)

| | |
|---|---|
| Hardener | 59 |
| Ciba Chemical's bisphenol A-epichlorohydrin resin | 195 |

(5)

| | |
|---|---|
| Hardener | 59 |
| 1,4-butanediol-epichlorohydrin resin | 101.1 |

The above systems are mixed thoroughly and placed in bar and plate molds, and each is cured at 80 degrees C. for 18 hours, except the bars of system 2 which are cured an additional 5 hours at 135 degrees C.

Products of systems 1 through 5, when tested by the A.S.T.M. standard methods set forth below for determining physical properties, give the results shown in the following table:

| | A.S.T.M. Test No. |
|---|---|
| Tensile strength and elongation | D638–46T |
| Izod impact strength | D256–47T |
| Heat distortion temperature | D648–45T |
| Hardness | D676–47T |
| Chemical resistance | D543–43 and D570–42 |

TABLE A

| Prepn. | Polyamine Properties | | | | Cured Resin Properties | | |
|---|---|---|---|---|---|---|---|
| | Percent Yield | $n_D^{20}$ | Boiling Point, °C./mm. | Epoxy Hardener Eq. Wt., g. | Tensile Strength, p.s.i. | Elongation, Percent | Izod Impact, ft. lb./in. notch |
| (a) | 43 | 1.5295 | 170/0.05 | 47.2 | 10,600 | 7.6 | 0.58 |
| (b) | 60 | 1.4975 | 176/0.05 | 120 | 10,200 | 7.5 | 0.55 |
| (c) | 42 | 1.5444 | 195/0.2 | 52.8 | 12,200 | 9.2 | 0.87 |
| (d) | 69.5 | 1.5280 | 145/0.01 | 65 | 11,590 | 9.0 | 0.90 |

TABLE B

| Resin | Tensile Strength, p.s.i. | Elongation, percent | Izod Impact, ft. lb./in. no tch | Shore D Hardness | Heat Dist., °C. | 7-Day H₂O Absorption, percent | 1-Day Toluene Absorption, percent |
|---|---|---|---|---|---|---|---|
| 1 | 102 | 59.4 | (¹) | 12 | Flexible | 5.4 | 178.0 |
| 2 | 10,750 | 6.9 | 0.38 | 88 | 92.2 | 0.31 | 0.04 |
| 3 | 11,240 | 8.8 | 1.375 | 96 | 72.8 | 0.30 | 0.15 |
| 4 | 11,200 | 10.1 | 0.77 | 86 |  | 0.35 | 0.09 |
| 4 | 184 | 120.0 | (¹) | 13 | Flexible | 19.3 | 14.2 |

¹ Did not break.

What is claimed is:

1.
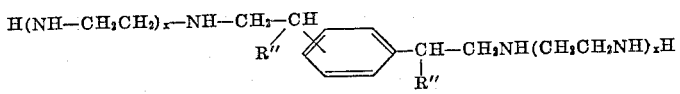

wherein wherein R″ is —H or —CH₃ and $x$ is an integer 1-4.

2. N,N' - bis(2 - aminoethyl)1,3 - bis(2 - aminoethyl) benzene.

References Cited

UNITED STATES PATENTS

| 2,449,644 | 9/1948 | Danforth | 260—577 |
| 3,126,381 | 3/1964 | Langis et al. | 260—570.5 XR |
| 3,202,674 | 8/1965 | Langis et al. | 260—570.2 XR |
| 3,256,332 | 6/1966 | Lassen | 260—570.8 |

CHARLES B. PARKER, *Primary Examiner.*

R. HINES, *Assistant Examiner.*